United States Patent [19]

Hewitt

[11] Patent Number: 5,207,142

[45] Date of Patent: May 4, 1993

[54] DIAPHRAGM FOR A VACUUM BRAKE BOOSTER

[75] Inventor: Wayne A. Hewitt, LaPorte, Ind.

[73] Assignee: Allied Signal Inc., Morristown, N.J.

[21] Appl. No.: 918,995

[22] Filed: Jul. 23, 1992

[51] Int. Cl.$^5$ ................................................. F15B 9/10
[52] U.S. Cl. ................................ 91/369.1; 91/376 R; 92/99; 92/98 D
[58] Field of Search .............. 92/96, 97, 98 R, 102, 92/98 D, 162 R, 162 P, 99; 91/369.1, 369.2, 376 R, 394, 401, 409

[56] References Cited

U.S. PATENT DOCUMENTS

| | | | |
|---|---|---|---|
| 3,448,659 | 6/1969 | Beatenbough et al. | 91/401 |
| 3,625,114 | 12/1971 | Golden | 91/394 |
| 4,542,680 | 9/1985 | Takeuchi | 92/99 |
| 5,111,453 | 11/1992 | Yared et al. | 91/376 R |

Primary Examiner—Thomas E. Denion
Attorney, Agent, or Firm—Leo H. McCormick, Jr.; Ken C. Decker

[57] ABSTRACT

A diaphragm for a brake booster having an annular inner bead with first and second radial surfaces separated by an apex. The second radial surface has a plurality of indentations that extend from the apex. In response to a positive pressure differential created by vacuum in a first chamber and air in a second chamber, an output force is developed to effect a brake application corresponding to an input force. This positive pressure differential act on the annular bead to urge said first radial face into engagement with a wall to prevent communication between the first and second chambers during a brake application. In the absence of the presence of vacuum in the first chamber, the input force acts on the wall to develop an operational pressure in the first chamber to develop a negative pressure differential between the first and second chambers. This negative pressure differential acts on the diaphragm to rotate the annular inner bead about the apex to move the first radial face away from the wall and allow communication between the first and second chambers through the indentations to attenuate the negative pressure differential and allow an input force to effect the brake application.

6 Claims, 2 Drawing Sheets

DIAPHRAGM FOR A VACUUM BRAKE BOOSTER

This invention relates to a diaphragm for a wall that separates a first chamber from a second chamber of a vacuum brake booster. The diaphragm has a plurality of indentations for communicating the first chamber with the second chamber in the absence of vacuum in the first chamber to allow an input force to directly effect a brake application without resistance.

In the construction of a vacuum brake booster it has been common practice to provide a wall for separating a front chamber from a rear chamber. In the early development of the wall, a seal was located on the peripheral surface to seal the front chamber from the rear chamber. Later it was determined that a more effective use of a resulting pressure differential could be achieved it the frictional resistance of the seal could be eliminated and as a result the seal was replaced with a rolling diaphragm such as disclosed in U.S. Pat. No. 3,279,327. The diaphragm has a first or peripheral bead held by flanges on the front and rear shells and a second or inner bead that snaps into a groove on the wall to prevent communication between the front and rear shell. The resiliency of the material of the diaphragm being sufficient to assure that a seal was achieved between the front and rear chambers. However, under some circumstances structure such as disclosed in U.S. Pat. No. 3,136,229 was provided to aid in holding the diaphragm on the wall during a brake application. Later, as disclosed in U.S. Pat. No. 3,958,497 a backing plate was designed to aid in retaining the inner bead of the diaphragm in a groove on the separation wall. In an effort to reduce the weight of a vacuum brake booster, the backing plate which made of medal for the wall was replaced in U.S. Pat. No. 5,076,142 with a unitary plastic structure which was reinforced with annular and radial ribs. The inner bead of the diaphragm of for this vacuum brake booster while forming a seal is located on a ledge and has a plurality of annular projections or buttons that are retained in openings in the wall to assure that communications do not occur between the chambers during a brake application.

The wall structure of the prior art vacuum brake booster perform in an adequate manner when vacuum is available as a source to develop a pressure differential. However, whenever vacuum is not available, a manual input force applied by an operator must move the wall to provide an output member with a force to effect a brake application. Unfortunately, the resulting output force derived from the manual input force is correspondingly reduced since movement of the wall compresses the air in the front chamber.

In the present invention, the diaphragm has a inner bead which seals the rear chamber from the front chamber when a source of vacuum is available to provide a positive pressure differential with air during a brake application and allows for communication between the front and rear chamber when vacuum is unavailable to effectively manually provide an input force to effect a brake application. The inner bead of the diaphragm has a first radial face separated from a second radial face by an apex. In the presence of vacuum, the annular apex engages the groove on the wall to seal the front chamber from the rear chamber. This seal is reinforced in the presence of a positive pressure differential developed with air in the rear chamber and vacuum in the front chamber which acts on the diaphragm to urge the first radial face on the inner bead into engagement with the wall to prevent communication between the rear chamber and the front chamber. In the absence of the availability of vacuum, the manual input force initially moves the wall to develop an output force which is supplied to an output member to effect a brake application. As the wall moves, an operational pressure develops in the first chamber as the air therein is compressed. This operational pressure is higher than the pressure of air in the rear chamber and as a result a negative or reverse pressure differential develops across the diaphragm. The negative pressure differential acts on the diaphragm to rotate the inner bead about the annular apex and allow communication between the first chamber and second chamber and attenuate the negative pressure differential to allow substantially the entire input force to be transferred as an output force to manually effect a brake application.

It is an object of this invention to provide a diaphragm for a brake booster which allows a manual input force to be substantially supplied to an output member to effect a brake application.

It is a further object of this invention to provide a diaphragm for a vacuum brake booster which has a first radial face and annular apex on an inner bead to provide sealing surface in the presence of a positive pressure differential and a plurality of indentations which allow for communication between a front chamber and a rear chamber in the absence of the available vacuum to reduce the development of a negative pressure differential and thereby allow a manual input force to be directly supplied to an output member to effect a brake application.

The foregoing features, advantages and objects of this invention will be more clearly appreciated in the ensuing description and drawings wherein.

Figure 1:
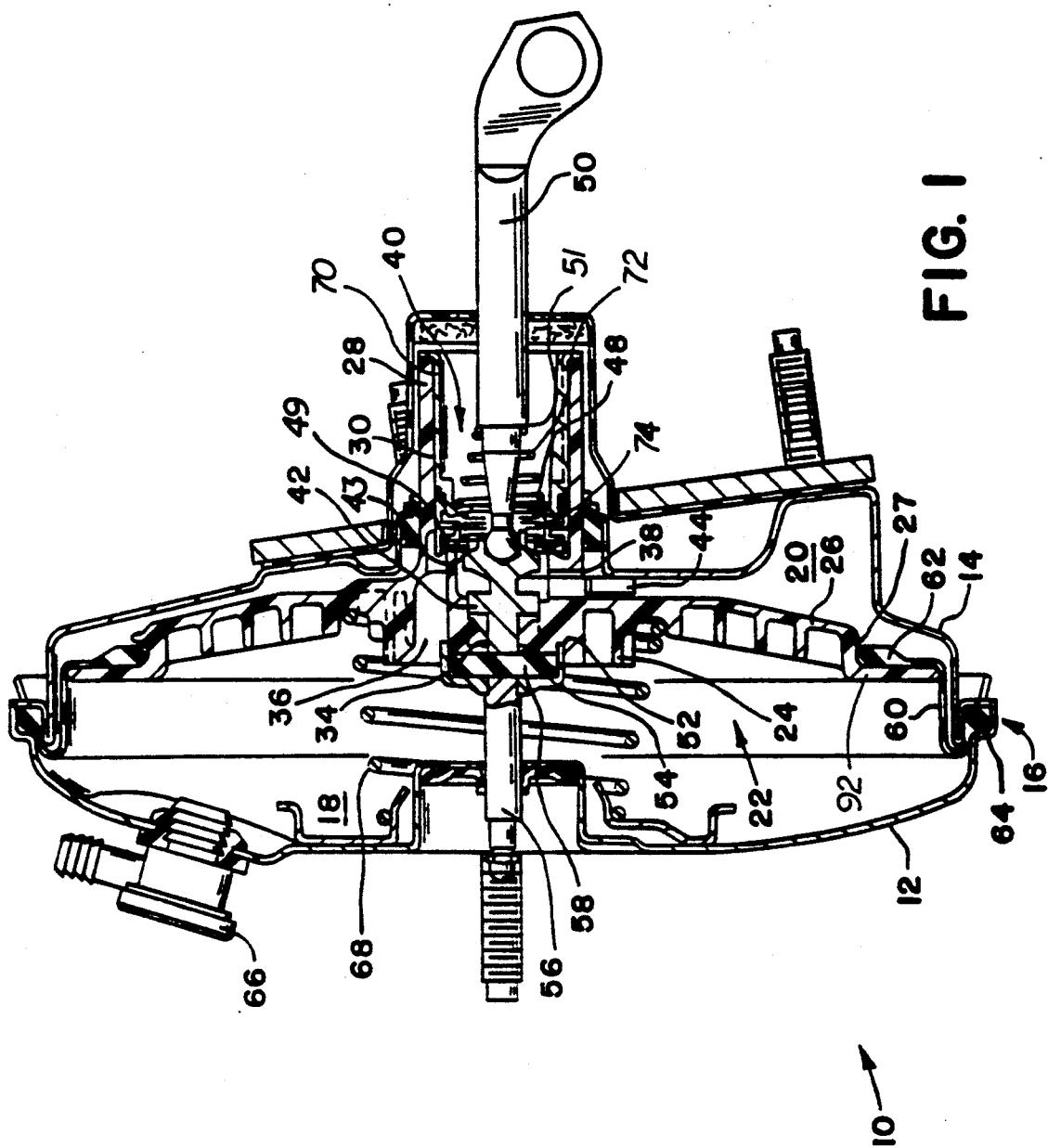
FIG. 1 is a sectional view of a brake booster having wall with a diaphragm made according to the principals of this invention.

FIG. 1 illustrates a typical single brake booster 10 of a type disclosed in U.S. patent application Ser. No. 843,678 wherein a front shell 12 is joined to a rear shell 14 by a twist lock arrangement 16 to form a unitary structure. A wall 22 which includes a radial disc 26 and diaphragm 60 divides the interior of the unitary structure into a front chamber 18 and a rear chamber 20. The radial disc 26 has an integral central hub 24 and a cylindrical projection 28 that extends through the rear shell 14. The diaphragm 60, shown in more detail in FIGS. 2, 3 and 4, has a first bead 62 located on a ledge of groove 27 on the radial disc 26 and a second bead 64 that is confined between flanges on the front shell 12 and rear shell 14 by the twist lock arrangement 16 to assure that the front 18 and rear 20 chambers are separated from each other and the environment. The central hub 24 and cylindrical projection 28 have an axial bore 30 which extend therethrough. The front of the central hub 24 has a face 32 with an annular groove 52 that surrounds a bearing surface 34 that extends inward into the axial bore 30. The central hub 24 has a first passageway 36 that extends from the front face 32 to an annular vacuum seat 31 in the axial bore 30 and a second passageway 38 that extends from the axial bore 30 through the cylindrical body 28. The annular groove 52 receives head 54 on output push rod 56 that surrounds reaction disc 58. Head 54 communicates an output force developed through movement of the wall 22 by a positive pressure differential between chambers 18 and 20 to output rod 56 connected to pistons in a master cylinder. The development of the output force is controlled by a control valve 40 located in bore 30 that responds to an input force applied to push rod 50. The control valve 40 has a plunger 42 which is retained in bore 30 by a key member 44 of the type disclosed in U.S. Pat. No. 4,953,446 and a poppet member 48 which is retained in bore 30 by a retainer member 70. A valve return spring 72 caged between the retainer member 70 and shoulder 51 on push rod 50 urges the plunger 42 toward the poppet member 48 while a poppet spring 74 urges face 49 on poppet member 48 toward an annular atmospheric seat 43 on plunger 42.

Figure 2:
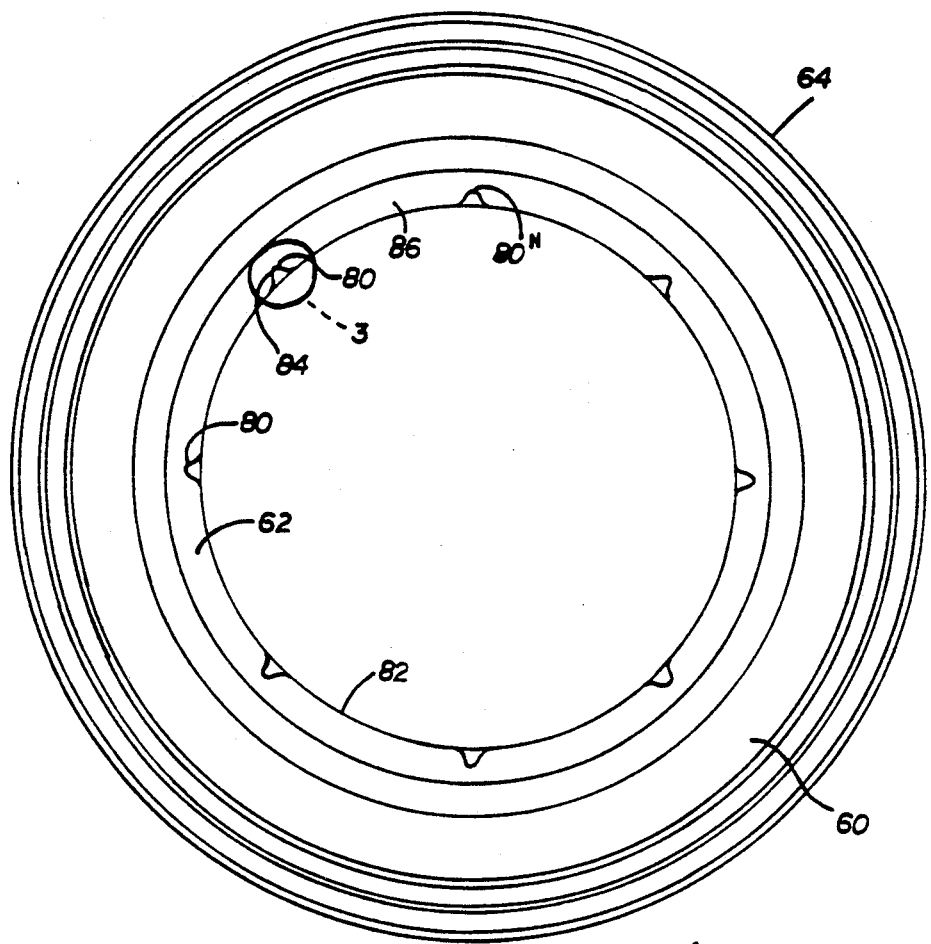
FIG. 2 is a view of the diaphragm of FIG. 1 prior to the insertion into a groove on the wall during the assembly of the brake booster.
Figure 4:
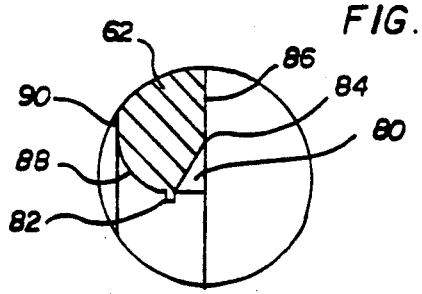
FIG. 4 is a sectional view taken along line 4—4 of FIG. 3.
Figure 3:
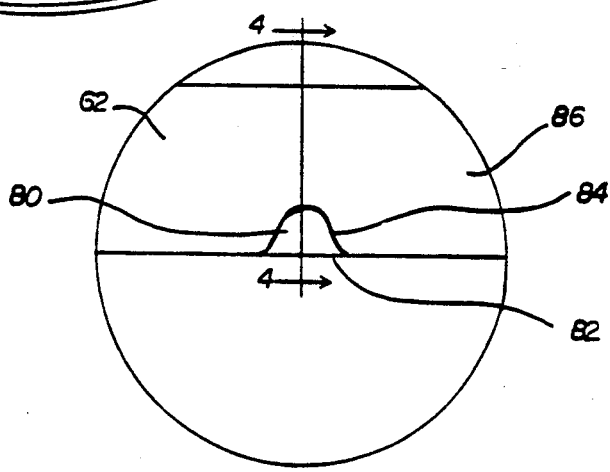
FIG. 3 is an enlarged view of the circumscribe area of FIG. 2.

The diaphragm 60 as shown in FIGS. 2, 3 and 4 has a plurality of indentations or scallops 80, 80' . . . $80^n$ which are equally spaced on the inner bead 62. The indentations 80, 80' . . . $80^n$ each have a smooth transition from the annular apex 82 toward a uniform surface 84 on radial face 86 to reduce the introduction of stress areas in bead 62 when subjected to forces associated with the development of a pressure differential resulting from pressure in chambers 18 and 20. Bead 62 has a curved surface 88 that extends from apex 82 to a radial face 90 that is adapted to form a seal with surface 92 on wall 26.

The brake booster 10 is located in a vehicle with chamber 18 connected to the intake manifold of an internal combustion engine through check valve 66. When the engine is in operation, vacuum is produced at the intake manifold which evacuates air from chambers 18 and 20 to allow return spring 68 to position wall 22 as shown in FIG. 1. When an operator desires to effect a brake application, an input force is applied to a brake pedal which overcomes return spring 72 and linearly moves push rod 50 and plunger 42. Initial movement of plunger 42 allows poppet spring 74 to urge face 49 on poppet 48 into engagement with vacuum seat 31 on hub 24 to assure that flow communication between the front or vacuum chamber 18 is interrupted with the rear or control chamber 20. Thereafter, annular seat 43 on plunger 42 moves away from an atmospheric seat on face 49 on poppet member 48 and allows air to flow from the environment through to poppet member 48 for distribution to the rear or control chamber 20 by way of passageway 38. With air in chamber 20 and vacuum in chamber 18, a positive pressure differential corresponding to the input force applied to the brake pedal is created to develop a force which acts on wall 22. After overcoming the force of return spring 68, the output force moves wall 22 toward chamber 18. The output force is communicated from wall 22 to head 54 through reaction disc 58 to provide the output rod 56 with the desired force to effect brake application. The positive pressure differential act on bead 62 to urge radial face 90 into engagement with surface 92 on wall 26 while the inherent resilience of bead 62 retains apex 82 in engagement with groove to assure no communication occurs between chambers 18 and 20 during a brake application. When the brake application is completed as indicated by the termination of an input force on push rod 50, valve return spring 72 moves plunger 42 to again position annular seat 43 on face 49 of poppet member 48 to interrupt communication of air from the atmosphere to chamber 20 while initiating communication between chambers 18 and 20 through passage 36, bore 30 and passage 38 as return spring 68 urges wall 22 toward shell 14 in the rest position shown in FIG. 1. With chamber 18 in communication with chamber 20, air is evacuated from chamber 20 by flowing through check valve 66 toward the intake manifold of the engine.

The vacuum brake booster 10 functions in the manner described above as long as vacuum is available to evacuate air from chambers 18 and 20. If the internal combustion engine is not operating and an operator has initiated a brake application, the pressure level in chambers 18 and 20 equalize at some pressure above the pressure of the vacuum. After about two or three brake application, the pressure level in chambers 18 and 20 approach atmospheric pressure and all brake force is manual during a brake application. The present invention comes into effect during a manual brake application in the following manner. With the pressure in chamber 18 at atmospheric pressure, a manual input applied to push rod 50 moves wall 22 toward shell 12 compressing air in chamber 18 to an operational pressure greater than atmospheric pressure. The operational pressure in chamber 18 and the pressure in chamber 20 at atmospheric pressure produce a negative pressure differential across wall 22 which opposes the movement of wall toward shell 12. The negative pressure differential acts on diaphragm 60 and causes inner bead 62 to rotate about apex 82 and move face 90 away from wall surface 92 as wall 20 moves toward shell 12. At some point in time as defined by the position of the bottom of the indentations 80, 80' . . . $80^n$ with respect to the apex 82, communication is established between chamber 18 and 20 to allow air to flow therebetween and thereby attenuate the development of a negative pressure differential such that substantially all of the manual input force applied to push rod 50 is transferred into output rod 56 to effect a brake application.

I claim:

1. A diaphragm of a wall member of a vacuum brake booster which separates a first chamber from a second chamber, said diaphragm having a peripheral bead retained by flanges on first and second shells and an annular central bead located in a groove of the wall member, said wall member responding to a first pressure differential resulting from a first pressure in said first chamber and a second pressure in said second chamber to provide an output member with a force in response to an input force for effecting a brake application, said annular central bead of said diaphragm being characterized by a first radial face, an annular apex and a second radial face, said second radial face having a plurality of indentations that extend to the center of said annular apex, said first pressure differential acting on said diaphragm to move said first radial face into engagement with said wall member to prevent communication between said first and second chambers, said input force in the absence of said first pressure moving said wall member to develop an operational pressure in said first chamber and a second pressure differential between said first and second chambers, said operational pressure acting on said diaphragm to rotate said annular bead about said annular apex and allow communication between said first chamber and second chamber through said plurality of indentations to attenuate said second pressure differential.

2. The diaphragm as recited in claim 1 wherein said indentations in said second radial face uniformly expand from said apex to provide for the smooth flow of air toward said second chamber.

3. The diaphragm as recited in claim 2 wherein said plurality of indentations are uniformly spaced on said second radial face.

4. The diaphragm as recited in claim 3 wherein said plurality of indentations are in the form of scallops to reduce the introduction of areas of stress concentration in said annular central bead.

5. A diaphragm of a wall member of a vacuum brake booster which separates a first chamber from a second chamber, said diaphragm having a peripheral bead retained by flanges on first and second shells and an annular central bead located in a groove of the wall member, said wall member responding to a positive pressure differential resulting from a first air pressure in said first chamber and a second air pressure in said second chamber to provide an output member with a force in response to an input force for effecting a brake application, said annular central bead of said diaphragm being characterized by a first radial face, an annular apex and a second radial face, said second radial face having a plurality of indentations that extend to the center of said annular apex, said positive pressure differential acting on said diaphragm to move said first radial face into engagement with said wall member to prevent communication between said first and second chambers, said input force in the absence of said first air pressure moving said wall member to develop an operational air pressure in said first chamber and a second pressure differential between said first and second chambers, said operational pressure acting on said diaphragm to rotate said annular bead about said annular apex and allow communication between said first chamber and second chamber through said plurality of indentations to attenuate said second pressure differential.

6. The diaphragm as recited in claim 5 wherein said plurality of indentations are uniformly spaced on said second radial face to reduce the introduction of areas of stress concentrations on said annular central bead.

* * * * *